United States Patent
Han

(10) Patent No.: US 12,493,189 B2
(45) Date of Patent: Dec. 9, 2025

(54) WEARABLE ELECTRONIC DEVICE

(71) Applicant: SAMSUNG ELECTRONICS CO., LTD., Suwon-si (KR)

(72) Inventor: Yonghwa Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 17/848,024

(22) Filed: Jun. 23, 2022

(65) Prior Publication Data

US 2022/0390752 A1 Dec. 8, 2022

Related U.S. Application Data

(63) Continuation of application No. PCT/KR2022/004520, filed on Mar. 30, 2022.

(30) Foreign Application Priority Data

Jun. 3, 2021 (KR) ................ 10-2021-0072271

(51) Int. Cl.
*G02B 27/01* (2006.01)

(52) U.S. Cl.
CPC .. *G02B 27/0176* (2013.01); *G02B 2027/0161* (2013.01); *G02B 2027/0178* (2013.01)

(58) Field of Classification Search
CPC ........ G02B 27/0176; G02B 2027/0161; G02B 2027/0178; G02B 27/01; G02C 5/2263; G02C 5/2281

See application file for complete search history.

(56) References Cited

U.S. PATENT DOCUMENTS

| | | | |
|---|---|---|---|
| 6,386,702 B1 | 5/2002 | Maloncon | |
| 2002/0047985 A1* | 4/2002 | Hollins | G02C 5/2263 351/114 |

(Continued)

FOREIGN PATENT DOCUMENTS

| | | |
|---|---|---|
| CN | 2365688 | 2/2000 |
| CN | 2395293 | 9/2000 |

(Continued)

OTHER PUBLICATIONS

Extended European Search Report dated Jul. 17, 2024 issued in European Patent Application No. 22816276.4.

(Continued)

*Primary Examiner* — Ricky L Mack
*Assistant Examiner* — K Muhammad
(74) *Attorney, Agent, or Firm* — Nixon & Vanderhye P.C.

(57) ABSTRACT

According to various example embodiments, a wearable electronic device may include: a lens frame; a housing; a translational bracket having a translational bracket main hole; an input screw penetrating through an outer wall of the housing; a rotating bracket having a rotating bracket main hole communicating with the translational bracket main hole and a rotating bracket auxiliary hole spaced apart from the rotating bracket main hole and rotatably connected to the housing; a connecting shaft passing through the translational bracket main hole and the rotating bracket main hole configured to rotate the rotating bracket while moving together with the translational bracket main hole; a cam having a cam hole communicating with the rotating bracket auxiliary hole and rotatably connected to the rotating bracket; a shield capable of hanging on the rotating bracket; and a leg connected to the shield.

20 Claims, 15 Drawing Sheets

(56) References Cited

U.S. PATENT DOCUMENTS

| | | |
|---|---|---|
| 2006/0132706 A1 | 6/2006 | Li |
| 2009/0231544 A1 | 9/2009 | Mahloch |
| 2012/0162764 A1 | 6/2012 | Shimizu |
| 2016/0341967 A1 | 11/2016 | Kaji et al. |
| 2018/0213212 A1* | 7/2018 | Liu .................. H04N 13/344 |

FOREIGN PATENT DOCUMENTS

| | | | |
|---|---|---|---|
| CN | 109782447 A | * | 5/2019 |
| CN | 110673345 | | 1/2020 |
| CN | 210573018 | | 5/2020 |
| IT | 20010012 | | 1/2003 |
| JP | 2002-277815 | | 9/2002 |
| JP | 2006-189740 | | 7/2006 |
| JP | 2009-282381 | | 12/2009 |
| JP | 2010-085590 | | 4/2010 |
| JP | 4873323 | | 2/2012 |
| JP | 2018-81280 | | 5/2018 |
| KR | 920003078 | | 2/1992 |
| KR | 20-0367300 | | 11/2004 |
| KR | 10-2007-0039892 | | 4/2007 |
| KR | 10-2012-0004635 | | 1/2012 |
| KR | 20-0464216 | | 12/2012 |
| KR | 10-2016-0044872 | | 4/2016 |
| KR | 10-2016-0093318 | | 8/2016 |
| KR | 10-2017-0016192 | | 2/2017 |
| KR | 101781577 B1 | * | 9/2017 |
| KR | 10-2019-0087972 | | 7/2019 |
| KR | 10-2019-0106914 | | 9/2019 |
| KR | 10-2019-0119892 | | 10/2019 |

OTHER PUBLICATIONS

Search Report issued Jul. 11, 2022 in counterpart International Patent Application PCTKR2022004520.

* cited by examiner

WEARABLE ELECTRONIC DEVICE

CROSS-REFERENCE TO RELATED APPLICATIONS

This application is a continuation of International Application No. PCT/KR2022/004520 designating the United States, filed on Mar. 30, 2022, in the Korean Intellectual Property Receiving Office and claiming priority to Korean Patent Application No. 10-2021-0072271, filed on Jun. 3, 2021, in the Korean Intellectual Property Office, the disclosures of which are incorporated by reference herein in their entireties.

BACKGROUND

1. Field

The disclosure relates to a wearable electronic device.

2. Description of Related Art

Recently, with a sudden growth of electronic devices such as smartphones, tablet personal computers (PCs), etc., the electronic devices enabling wireless voice call and information exchange have become necessities of life. Electronic devices were initially recognized as simply portable devices for wireless calls. However, with the development of technology and the introduction of the wireless Internet, electronic devices are not simply portable devices for wireless calls but are developed into multimedia devices for performing functions such as scheduling, gaming, remote control, or image capturing, satisfying user demands.

In particular, in recent years, an electronic device providing an augmented reality (AR) service has been introduced on the market. An AR service is a service of superimposing a virtual image having supplementary information on a real-world image seen by a user and showing the superimposition result, and may provide a user with a virtual image including content related to a real object identified from the real-world image.

An electronic device for providing the AR service may operate while worn by a user. Such an electronic device may include, for example, a wearable electronic device, particularly a glasses-type electronic device.

Functions of a wearable electronic device are diversifying. For example, there are functions for data and voice communication, taking pictures and recording videos with a camera, recording voice, playing music files through a speaker system, and outputting images or videos to a display unit. Some electronic devices have an electronic game play function added or perform a multimedia player function. In particular, recently, an electronic device may receive a multicast signal providing visual content.

Since a wearable electronic device has to be worn on a user's body, it may be an important factor to adjust a size of the wearable electronic device to fit the user's body size. For example, in the case of a glasses-type electronic device, when a width of the device is adjusted to fit the user's head size, the user can wear the glasses-type electronic device more comfortably.

SUMMARY

Embodiments of the disclosure provide a wearable electronic device having a width adjustable in a simple manner.

According to various example embodiments, a wearable electronic device is provided, the wearable electronic device including: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and a rotating bracket auxiliary hole spaced apart from the rotating bracket main hole, and rotatably connected to the housing, and a connecting shaft passing through the translational bracket main hole and the rotating bracket main hole configured to rotate the rotating bracket while moving together with the translational bracket main hole.

According to various example embodiments, a wearable electronic device may include: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and a rotating bracket auxiliary hole spaced apart from the rotating bracket main hole, and rotatably connected to the housing, the connecting shaft passing through the translational bracket main hole and the rotating bracket main hole configured to rotate the rotating bracket while moving together with the translational bracket main hole, a cam having the cam hole communicating with the rotating bracket auxiliary hole and rotatably connected to the rotating bracket, a shield connected to the cam and capable of hanging on the rotating bracket, and a leg connected to the shield.

According to various example embodiments, a wearable electronic device may include: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and having a wider area than the translational bracket main hole and a rotating bracket auxiliary hole spaced apart from the rotating bracket main hole, and rotatably connected to the housing, the connecting shaft passing through the translational bracket main hole and the rotating bracket main hole configured to rotate the rotating bracket while moving together with the translational bracket main hole, a cam a having a cam hole communicating with the rotating bracket auxiliary hole and rotatably connected to the rotating bracket, a shield connected to the cam and capable of hanging on the rotating bracket, and a leg connected to the shield.

According to various example embodiments, it is possible to adjust a width of a wearable electronic device in a simple manner.

Further, according to various example embodiments, the wearable electronic device may have a detent function.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
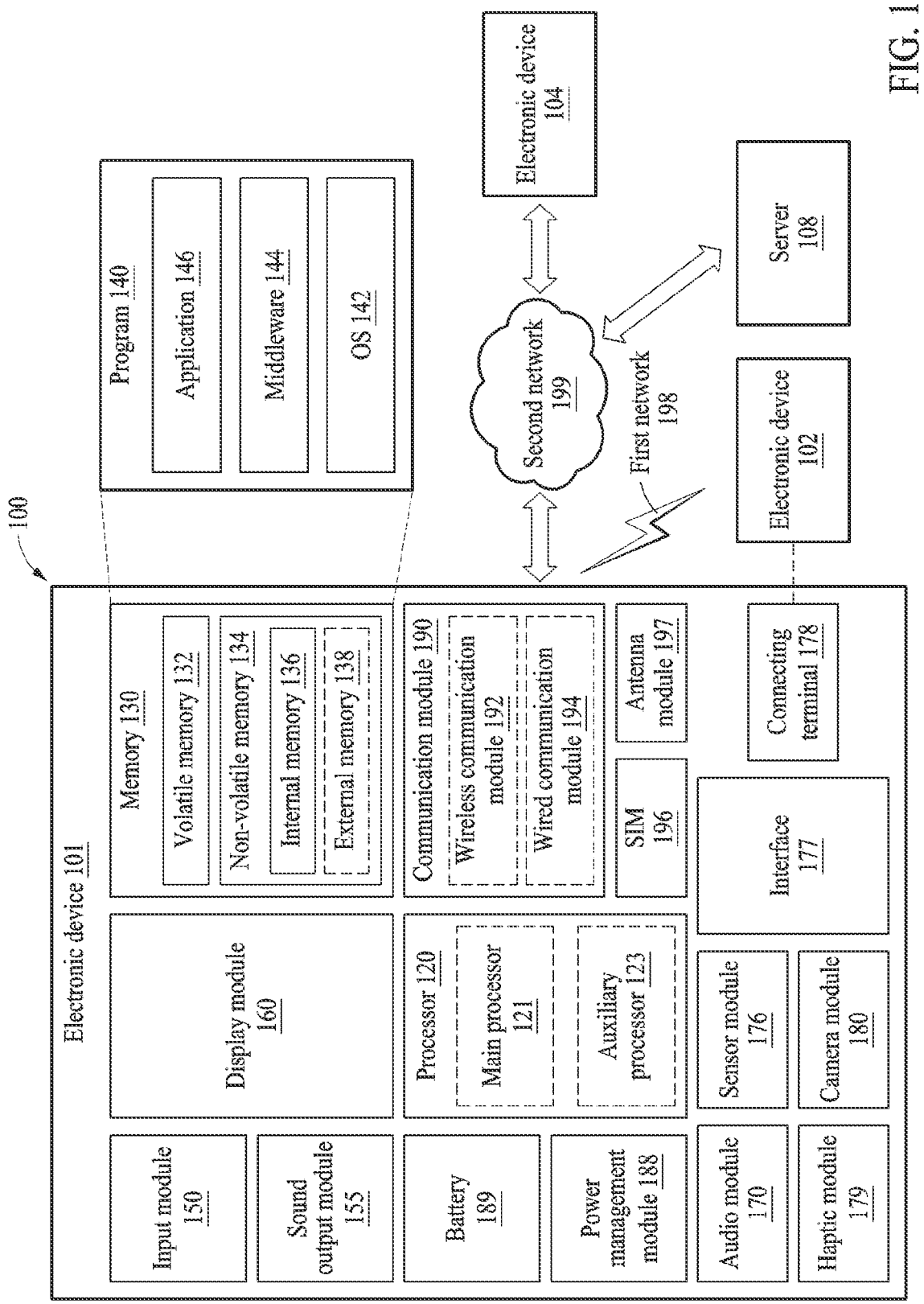
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

Hereinafter, example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
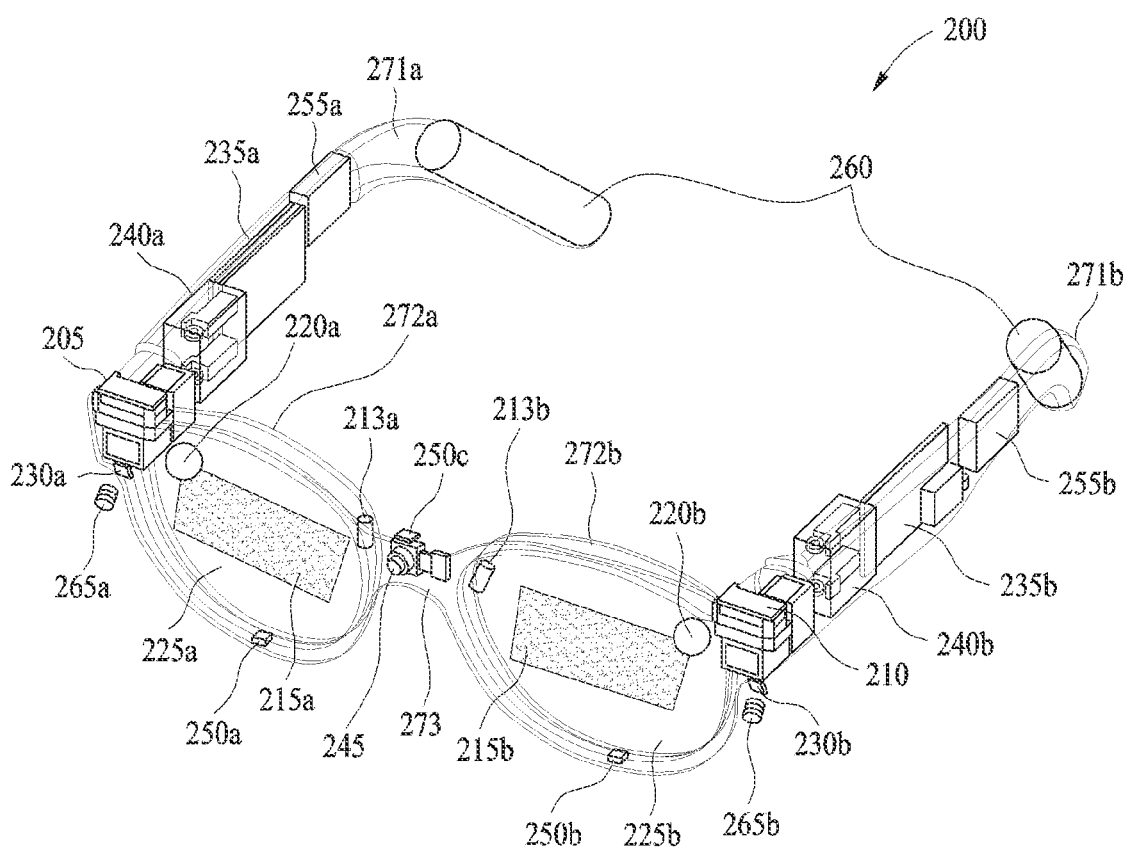
FIG. 2 is a diagram illustrating an example structure of a wearable electronic device according to various embodiments.

FIG. 2 is a diagram illustrating an example structure of a wearable electronic device according to various embodiments.

Referring to FIG. 2, a wearable electronic device 200 (e.g., the electronic device 101 of FIG. 1) may be worn on a face of a user to provide the user with an image associated with an augmented reality (AR) service and/or a virtual reality (VR) service.

In an example embodiment, the wearable electronic device 200 may include a first display 205, a second display 210, an optical waveguide 215a, 215b, an input optical member 220a, 220b, a first transparent member 225a, a second transparent member 225b, a lighting unit 230a, 230b, a first PCB 235a, a second PCB 235b, a first hinge 240a, a second hinge 240b, a first camera 245, a plurality of microphones (e.g., a first microphone 250a, a second microphone 250b, and a third microphone 250c), a plurality of speakers (e.g., a first speaker 255a, and a second speaker 255b), a battery 260, a second camera 265a, and a third camera 265b.

In an example embodiment, a display (e.g., the first display 205, the second display 210, and the display module 160 of FIG. 1) may include, for example, a liquid crystal display (LCD), a digital mirror device (DMD), or a liquid crystal on silicon (LCoS), an organic light emitting diode (OLED), or a micro light emitting diode (micro-LED). Although not shown, when the display is one of the LCD, the DMD, and the LCoS, the wearable electronic device 200 may include a light source emitting light to a screen output area of the display. In an example embodiment, when the display is capable of generating light by itself, for example, when the display is either the OLED or the micro-LED, the wearable electronic device 200 may provide a virtual image with a relatively high quality to the user even though a separate light source is not included. In an example embodiment, when the display is implemented as the OLED or the micro-LED, a light source may be unnecessary, and accordingly the wearable electronic device 200 may be reduced in weight. Hereinafter, a display capable of generating light by itself may be referred to as a "self-luminous display", and description will be made on the assumption of the self-luminous display.

The display (e.g., the first display 205 and the second display 210) according to various example embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, it may be possible to provide a high resolution without a backlight unit (BLU), when the display is implemented as the micro-LED.

However, the example embodiments are not limited thereto. A single pixel may include R, G, and B pixels, and a single chip may be implemented by a plurality of pixels including R, G, and B pixels.

In an example embodiment, the display (e.g., the first display 205 and the second display 210) may include pixels for displaying a virtual image. The display may further include infrared pixels that emit infrared light.

In an example embodiment, the display may further include light-receiving pixels (e.g., photo sensor pixels) that are disposed between pixels to receive light reflected from eyes of a user, convert the received light to electrical energy, and output the electrical energy. A light-receiving pixel may be referred to as a "gaze tracking sensor". The gaze tracking sensor may detect infrared light generated by reflecting light emitted by an infrared pixel included in the display by eyes of the user.

In an example embodiment, the wearable electronic device 200 may include a separate gaze tracking camera 213a, 213b (e.g., an IR LED detection sensor). The gaze tracking camera 213a, 213b may detect infrared light reflected by the eyes of the user. The wearable electronic device 200 may track a gaze of the user based on the infrared light detected by the gaze tracking camera 213a, 213b. The wearable electronic device 200 may determine a central position of a virtual image according to gaze directions (e.g., directions in which pupils of a right eye and a left eye of a user gaze) of a right eye and a left eye of the user.

In an example embodiment, the wearable electronic device 200 may detect a gaze direction (e.g., a movement of a pupil) of a user, using the light receiving pixels. For example, the wearable electronic device 200 may detect and track a gaze direction of the right eye of the user and a gaze direction of the left eye of the user through one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze).

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210.

In an example embodiment, light emitted from the display (e.g., the first display 205 and the second display 210) may reach the optical waveguide 215a formed on the first transparent member 225a that faces the right eye of the user, and the optical waveguide 215b formed on the second transparent member 225b that faces the left eye of the user, by passing through a lens (not shown) and a waveguide. For example, the light emitted from the display (e.g., the first display 205 and the second display 210) may be reflected from a grating area of the waveguide formed in the input optical member 220a, 220b and the optical waveguide 215a, 215b, and may be transmitted to the eyes of the user. The first transparent member 225a and/or the second transparent member 225b may be formed of a glass plate, a plastic plate, or a polymer, and may be transparently or translucently formed. The first transparent member 225a and the second transparent member 225b may each include a transparent substrate on which a transparent electrode formed of indium tin oxide (ITO) is disposed.

In an example embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an example embodiment, the optical waveguide 215a, 215b or a transparent member (e.g., the first transparent member 225a and the second transparent member 225b) may include a lens including the waveguide, a reflective lens. The waveguide may be referred to as an "optical waveguide". The waveguide may be a path through which external light is incident, totally reflected, and emitted, and may be distinguished from the first transparent member 225a and the second transparent member 225b through which external light is simply reflected or transmitted.

In an example embodiment, the waveguide may be formed of glass, plastic, or a polymer, and may have a nanopattern formed on one surface of inside or outside, for example, a grating structure of a polygonal or curved shape. According to an example embodiment, light incident to one end of the waveguide through the input optical member 220a, 220b may be propagated inside a display waveguide by the nanopattern to be provided to the user. In an example embodiment, a waveguide including a free-form prism may provide incident light to the user through a reflection mirror. The waveguide may include at least one diffraction element such as a diffractive optical element (DOE) and a holographic optical element (HOE) or at least one of reflective elements (e.g., a reflection mirror). In an example embodiment, the waveguide may guide the light emitted from the display 205, 210 to the eyes of the user, using the at least one diffractive element or reflective element included in the waveguide.

According to various example embodiments, the diffractive element may include the input optical member 220a, 220b and/or an output optical member (not shown). For example, the input optical member 220a, 220b may refer, for example, to an input grating area, and the output optical member (not shown) may refer, for example, to an output grating area. An input grating area may function as an input terminal to diffract (or reflect) light output from the display (e.g., the first display 205 and the second display 210 (e.g., a micro-LED)) to transmit the light to the optical waveguide 215a, 215b. An output grating area may function as an exit to diffract (or reflect) light transmitted to the waveguide to the eyes of the user.

A waveguide may function as a path through which light passes. The waveguide may include the input optical member 220a, 220b and an output optical member (not shown). An area of the waveguide in which light is totally reflected may be combined with or separated from the input optical member 220a, 220b and the output optical member (not shown).

According to various example embodiments, reflective elements may include a total internal reflection optical element or a total internal reflection waveguide for total internal reflection (TIR). For example, TIR, which is one of schemes of inducing light, may form an angle of incidence such that light (e.g., a virtual image) entering through the input grating area is completely or almost completely reflected from one surface (e.g., a specific surface) of the waveguide, to completely or almost completely transmit the light to the output grating area.

In an example embodiment, the light emitted from the first display 205, 210 may be guided to the waveguide through the input optical member 220a, 220b. Light traveling in the waveguide may be guided toward the eyes of the user through the output optical member. A screen output area may be determined based on light emitted toward the eyes of the user.

In an example embodiment, the first camera 245 may be referred to as a "high resolution (HR)" or a "photo video (PV)", and may include a high-resolution camera. The first camera 245 may include a color camera having functions for obtaining a high-quality image, such as an automatic focus (AF) function and an optical image stabilizer (OIS). The example embodiments are not limited thereto, and the first camera 245 may include a global shutter (GS) camera or a rolling shutter (RS) camera.

In an example embodiment, the second camera 265a and the third camera 265b may each include a camera used for three degrees of freedom (3 DoF) and six degrees of freedom (6 DoF) head tracking, hand detection and tracking, and gesture and/or space recognition. For example, the second camera 265a and the third camera 265b may each include a GS camera to detect a movement of a head and a hand and track the movement.

In an example embodiment, at least one sensor (not shown, e.g., a gyro sensor, an acceleration sensor, a geomagnetic sensor, and/or a gesture sensor), the second camera 265a and the third camera 265b may perform at least one of head tracking for 6 DoF, pose estimation and prediction, gesture and/or space recognition, and/or a slam function through depth imaging.

In an example embodiment, the second camera 265a and the third camera 265b may be classified and used as a camera for head tracking and a camera for hand tracking.

In an example embodiment, the lighting unit 230a, 230b may be omitted. The lighting unit 230a, 230b may be replaced by infrared pixels included in the first display 205 and the second display 210. In an example embodiment, the lighting unit 230a, 230b may be included in the wearable electronic device 200 to assist the infrared pixels included in the first display 205 and the second display 210. The lighting unit 230a, 230b may be used differently according to a position in which the lighting unit 230a, 230b is attached. For example, the lighting unit 230a, 230b may be attached together with the second camera 265a and the third camera 265b mounted around a hinge (e.g., the first hinge 240a and the second hinge 240b) that connects a frame 272a, 272b and a temple 271a, 271b or around a bridge 273 that connects the frames. If capturing is performed using a GS camera, the lighting unit 230a, 230b may be used to supplement a surrounding brightness. For example, the lighting unit 230a, 230b may be used in a dark environment or when it is not easy to detect a subject to be captured due to mixing of various light sources and reflected light.

In an example embodiment, a second control circuit (not shown, e.g., the processor 120 of FIG. 1) to control components of the wearable electronic device 200 other than the first display 205 and the second display 210 may be located in a PCB (e.g., the first PCB 235a and the second PCB 235b). The second control circuit may control the components other than the first display 205 and the second display 210 and perform an operation such as depth value estimation. The second control circuit may include a communication circuit (e.g., the communication module 190 of FIG. 1) or a memory (e.g., the memory 130 of FIG. 1). In an example embodiment, the first control circuit and the second control circuit may be integrated as a single circuit. For example, an integrated control circuit may control the first display 205, the second display, and/or the other components.

In an example embodiment, a plurality of microphones (e.g., the first microphone 250a, the second microphone 250b, and the third microphone 250c, and the input module 150 of FIG. 1) may convert an external acoustic signal into electrical audio data. The electrical audio data may be variously utilized according to a function (or an application being executed) being performed by the wearable electronic device 200.

In an example embodiment, a plurality of speakers (e.g., the first speaker 255a, the second speaker 255b, and the sound output module 155 of FIG. 1) may output audio data received from a communication circuit (e.g., the communication module 190 of FIG. 1) or stored in a memory (e.g., the memory 130 of FIG. 1).

In an example embodiment, one or more batteries 260 (e.g., the battery 189 of FIG. 1) may be included and may supply power to the components of the wearable electronic device 200.

Figure 3A:
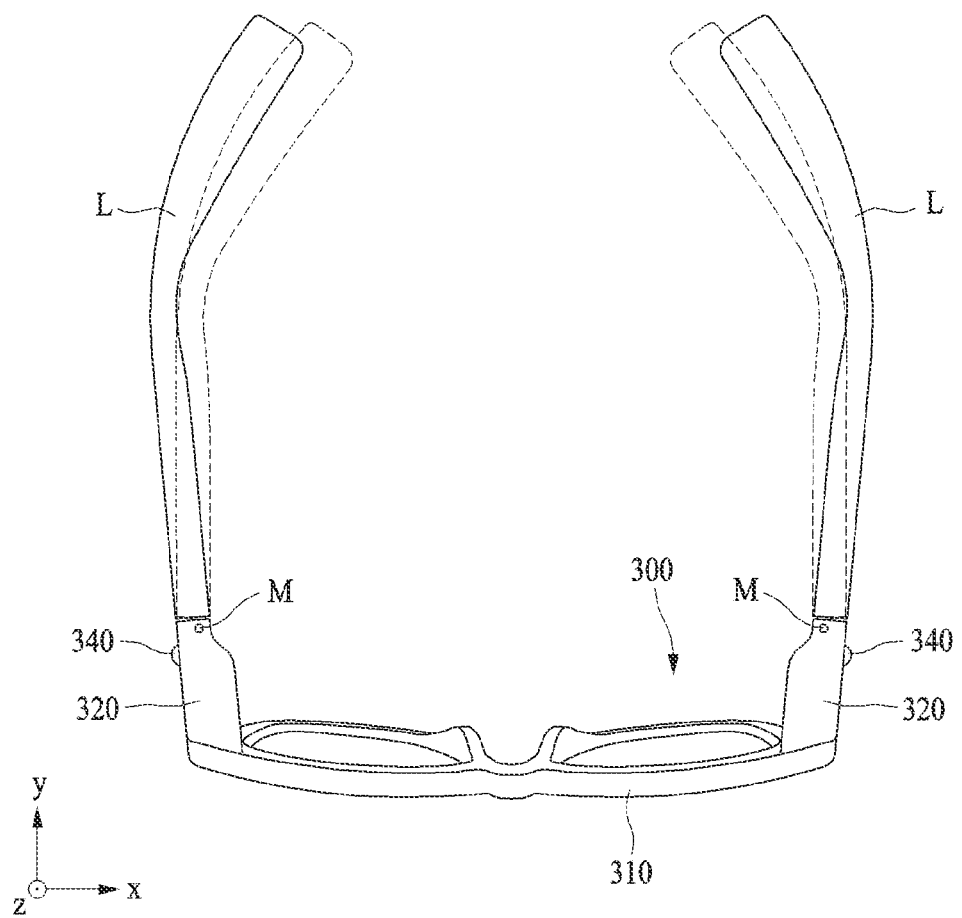
FIG. 3A is a diagram illustrating a wearable electronic device according to various embodiments.
Figure 3B:
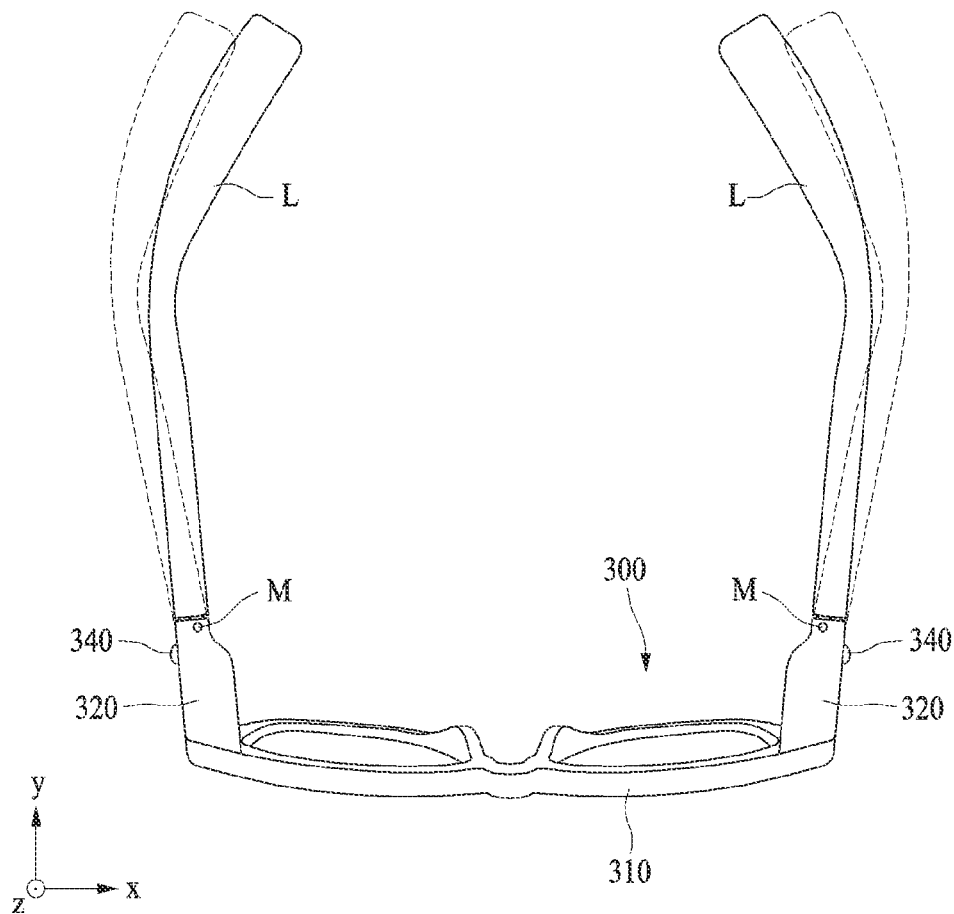
FIG. 3B is a diagram illustrating a wearable electronic device according to various embodiments.
Figure 3C:
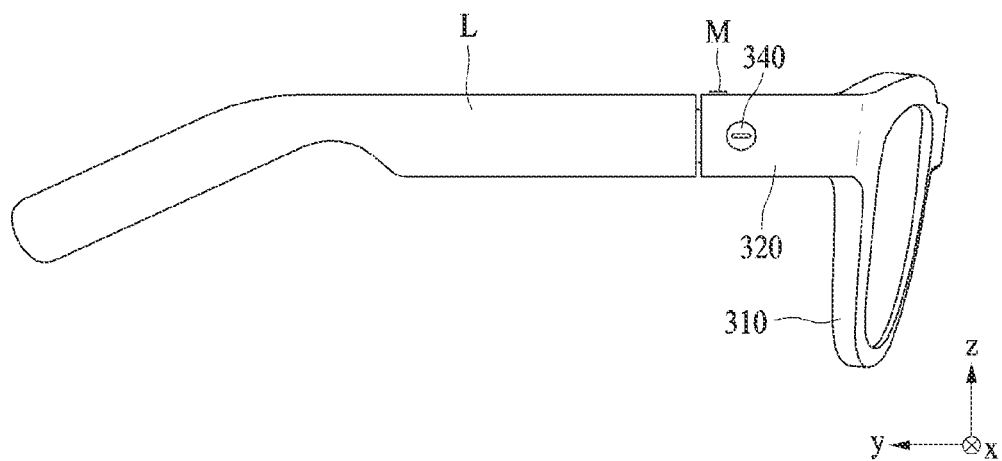
FIG. 3C is a side view illustrating a wearable electronic device according to various embodiments.

FIG. 3A is a diagram illustrating a wearable electronic device according to various embodiments, FIG. 3B is a diagram illustrating the wearable electronic device according to various embodiments, and FIG. 3C is a side view illustrating the wearable electronic device according to various embodiments.

Referring to FIGS. 3A, 3B and 3C (which may be referred to as FIGS. 3A to 3B), a wearable electronic device 300 may be worn on a user's body, for example, a user's head. The wearable electronic device 300 may include, for example, the various components of the wearable electronic device 200 of FIG. 2. The wearable electronic device 300 may include a lens frame 310 capable of accommodating a lens, a housing 320 connected to both ends of the lens frame 310, an input screw 340 rotatably connected to the housing 320, and a pair of legs L of which a maximum open angle may be adjusted by the input screw 340. Each of the pair of legs L may rotate around a main shaft M. Herein, a maximum open angle indicates an angle formed by a leg L with respect to the lens frame 310 in a state in which the leg L is maximally open, and the angle may be, for example, 80 degrees to 110 degrees.

When a width of the lens frame 310 is in an x-axial direction and a height of the lens frame 310 is in a z-axial direction, the housing 320 may extend from the lens frame 310 in a y-axial direction. The lens frame 310 and the housing 320 may be formed separately and connected to each other, or may be formed integrally.

The wearable electronic device 300 may have an adjustable width to fit a user's body size. For example, the wearable electronic device 300 may relatively increase a distance between the pair of legs L as illustrated in FIG. 3A, and may relatively decrease the distance between the pair of legs as illustrated in FIG. 3B.

Herein, a distance between the pair of legs L may refer, for example, to a distance between respective distal ends of the pair of legs L. A distal end may refer, for example, to an end of a leg L spaced farthest from the housing 320. A proximal end of the leg L may be provided in contact with the housing 320 or may be provided close to the housing 320.

For example, when a user's head size is relatively large, it is possible to improve a wearability by increasing the distance between the pair of legs L. When the user's head size is relatively small, it is possible to improve the wearability by decreasing the distance between the pair of legs L.

Each of the pair of legs L may rotate around the main shaft M. For example, the leg L shown on a left side of FIG. 3A may be folded by rotating clockwise around the main shaft M and may be open by rotating counterclockwise around the main shaft M. In a state in which the leg L is folded, the leg L may be approximately parallel to the lens frame 310. In a state in which the user wears the wearable electronic device 300 on the head, the legs L may be completely open. The wearable electronic device 300 may include a structure capable of adjusting the distance between the pair of legs L in a state in which the pair of legs L are completely open. The structure will be described in detail below.

Figure 4A:
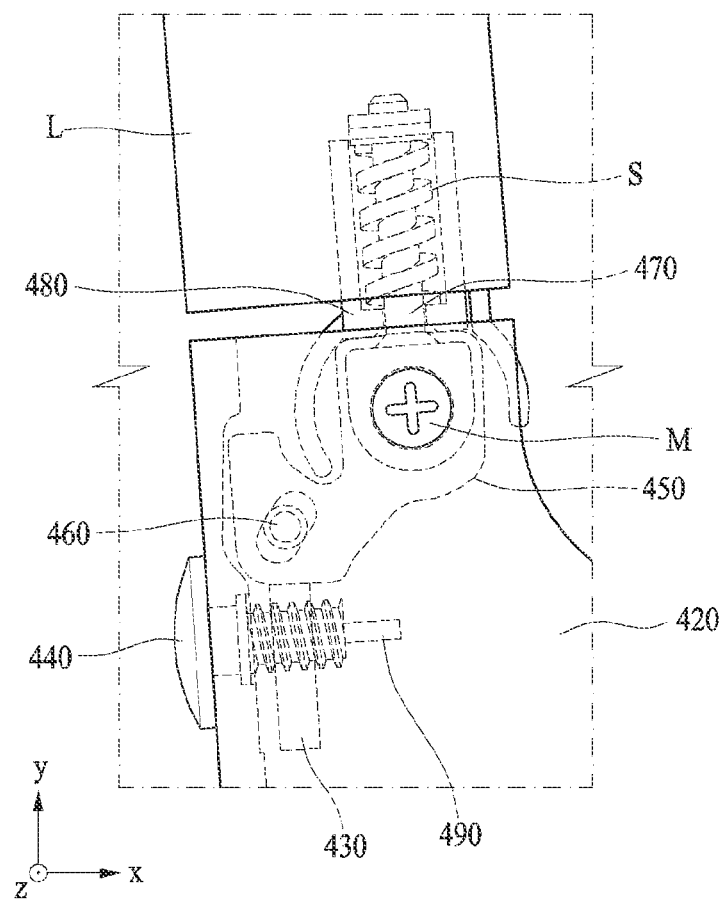
FIG. 4A is an enlarged view illustrating a portion of a wearable electronic device according to various embodiments.
Figure 4B:
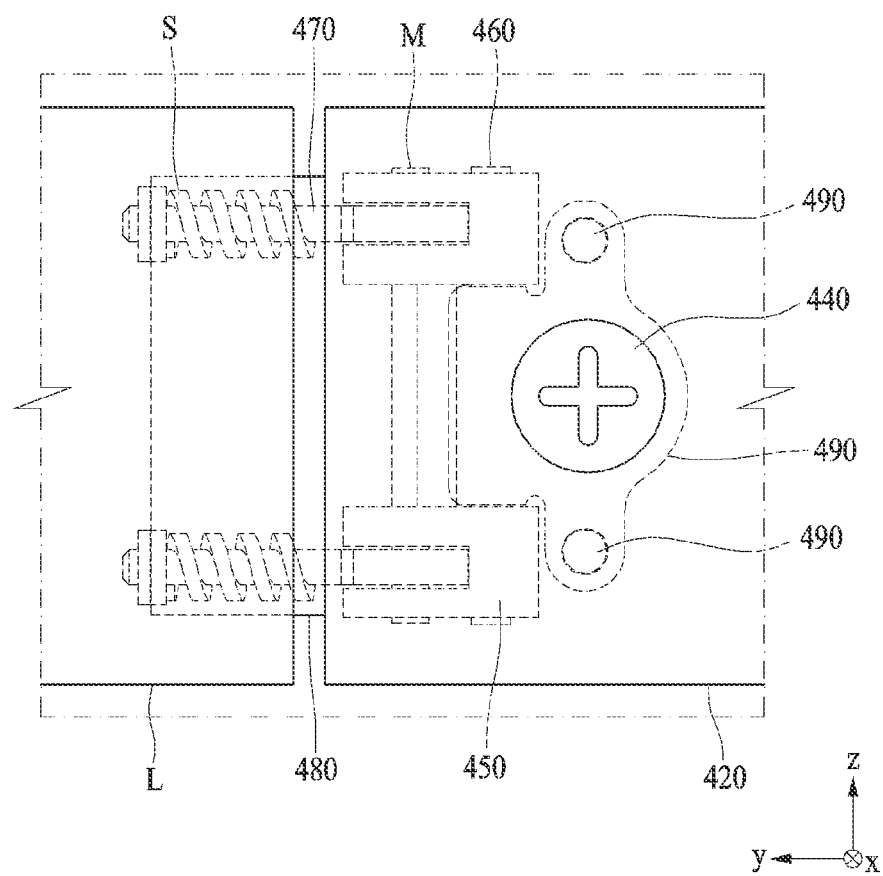
FIG. 4B is an enlarged side view illustrating a portion of a wearable electronic device according to various embodiments.
Figure 4C:
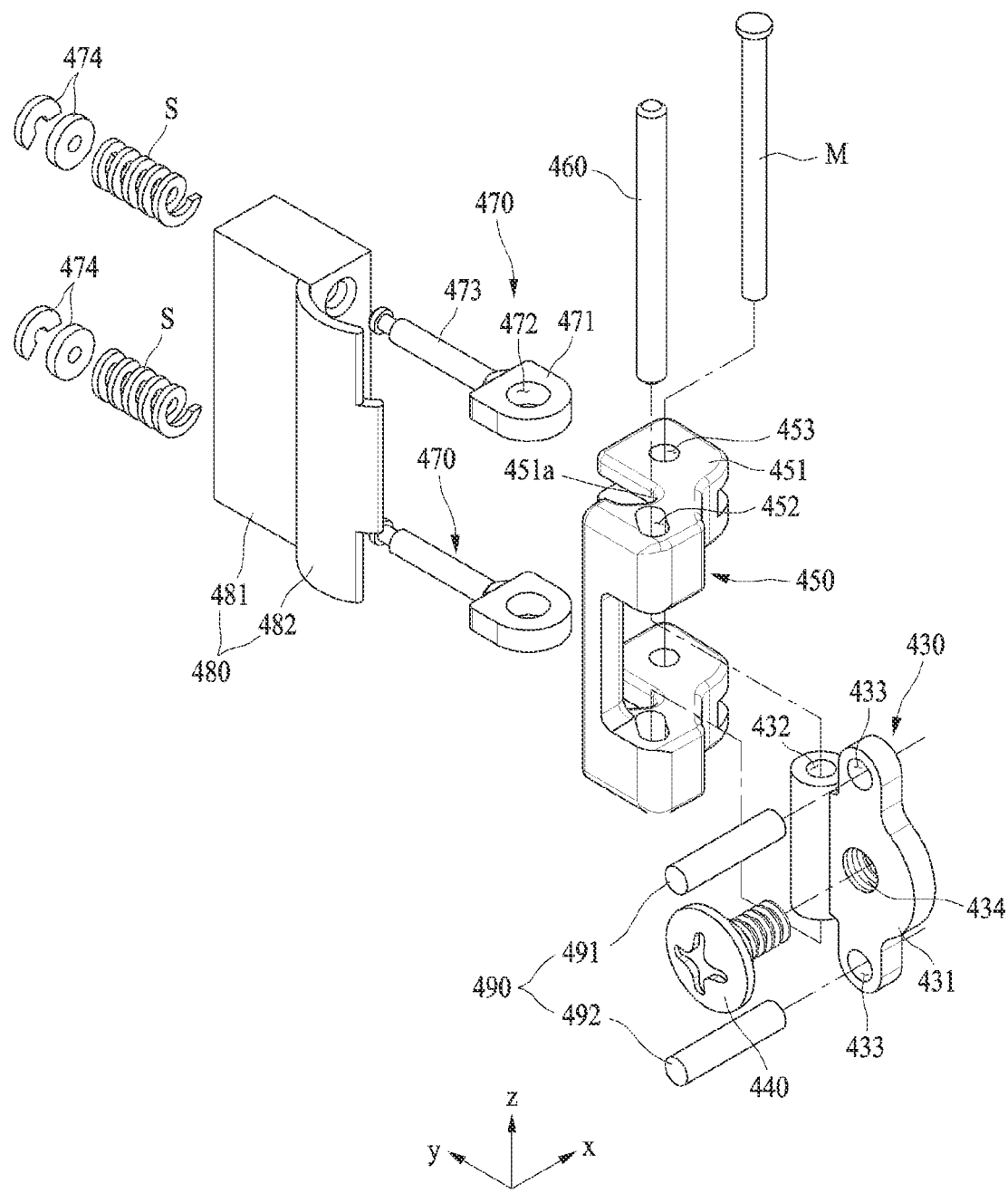
FIG. 4C is an exploded perspective view illustrating a wearable electronic device according to various embodiments.

FIG. 4A is an enlarged view illustrating a portion of a wearable electronic device according to various embodiments, FIG. 4B is an enlarged side view illustrating a portion of the wearable electronic device according to various embodiments, and FIG. 4C is an exploded perspective view illustrating the wearable electronic device according to various embodiments.

Referring to FIGS. 4A, 4B and 4C (which may be referred to as FIGS. 4A to 4C), a wearable electronic device, according to an example embodiment, may adjust a maximum open angle of a leg L. The wearable electronic device may include a housing 420, a translational bracket 430, a guide shaft 490, an input screw 440, a rotating bracket 450, a connecting shaft 460, a spring S, a main shaft M, a cam 470, a shield 480, and the leg L. Although a description will be made based on the housing 420 and other components located at an end portion in a −x direction of a lens frame (e.g., the lens frame 310 of FIG. 3A), the description may also apply to the housing 420 and other components located at an end portion in a +x direction.

The housing 420 may have an accommodation space therein. The housing 420 may accommodate at least one of the translational bracket 430, the guide shaft 490, the input screw 440, the rotating bracket 450, the connecting shaft 460, the spring S, the main shaft M, the cam 470, and/or the shield 480 in the accommodation space.

The translational bracket 430 may move in a state of being accommodated in the housing 420. The translational bracket 430 may perform a one-degree of freedom (1 DoF) translational motion. The translational bracket 430 may include a translational bracket body 431, a translational bracket main hole 432, a translational bracket auxiliary hole 433, and a translational bracket screw hole 434.

The translational bracket body 431 may be accommodated in the housing 420. The translational bracket body 431 may include a plate-shaped portion of which the 1 DoF translational motion is guided by the guide shaft 490 and a pillar portion having the translational bracket main hole 432. The translational bracket main hole 432 may be formed through the pillar portion of the translational bracket body 431. The translational bracket main hole 432 may be formed approximately parallel to a height direction of the housing 420, for example, a z-axis. The translational bracket auxiliary hole 433 may accommodate the guide shaft 490. The translational bracket auxiliary hole 433 may be formed in a direction intersecting with the translational bracket main hole 432. For example, the translational bracket auxiliary hole 433 may be formed approximately parallel to an x-axis. The translational bracket screw hole 434 may accommodate the input screw 440. The translational bracket screw hole 434 may include screw threads for screwing to the input screw 440. For example, two translational bracket auxiliary holes 433 may be provided opposite to each other with the translational bracket screw hole 434 as a center.

The guide shaft 490 may assist the translational bracket body 431 to perform the 1 DoF motion. For example, at least two guide shafts 490 may be formed, and the guide shafts 490 may be provided parallel to each other and may penetrate through the translational bracket body 431. The guide shaft 490 may be fixedly installed in the housing 420. The guide shaft 490 may set a movement direction of the translational bracket 430 so that the translational bracket 430 does not move in an unintended direction. For example, the guide shaft 490 may assist the translational bracket 430 not to rotate. For example, the guide shaft 490 may include a first guide shaft 491 and a second guide shaft 492. The first guide shaft 491 and the second guide shaft 492 may be provided opposite to each other with the input screw 440 as a center. The first guide shaft 491 and the second guide shaft 492 may be provided parallel to the input screw 440.

The input screw 440 may be rotatably connected to an outer wall of the housing 420. Herein, an outer wall of a housing may refer, for example, to an outer wall to which an input screw is connected, in an external appearance of the housing. For example, the input screw 440 may be connected to the housing 420 so that the input screw 440 may only be allowed to perform a rotational motion in a state in which the position thereof is fixed to the housing 420. The input screw 440 may transmit power to the screwed translational bracket 430. For example, when the input screw 440 rotates, the translational bracket 430 may not rotate along the input screw 440 because a rotational motion of the translational bracket 430 is limited by the guide shaft 490. The input screw 440 may assist the translational bracket 430 to perform a translational motion by applying a force to the screw threads of the translational bracket 430. For example, when the input screw 440 rotates in a first direction, the translational bracket 430 may perform the translational motion in a direction toward the outer wall of the housing 420. For example, when the input screw 440 rotates in a second direction opposite to the first direction, the translational bracket 430 may perform the translational motion in a direction away from the outer wall of the housing 420. The input screw 440 may have a screw groove for accommodating a tip of a driver (not shown).

The rotating bracket 450 may support the cam 470. While the leg L rotates around the lens frame (e.g., the lens frame 310 of FIG. 3A), the rotating bracket 450 may not rotate around the housing 420 along with the leg L but maintain a state of being fixed to the housing 420. While the translational bracket 430 performs the translational motion in the housing 420, the rotating bracket 450 may rotate around the housing 420. For example, when the translational bracket 430 rotates in the direction toward the outer wall of the housing 420, the rotating bracket 450 may rotate clockwise around the z-axis (See FIG. 4A). With respect to the height direction, that is the z-axial direction, of the housing 420, at least a portion of the rotating bracket 450 may overlap the translational bracket 430, and another portion of the rotating bracket 450 may overlap the cam 470.

The rotating bracket 450 may include a rotating bracket body 451, a rotating bracket main hole 452 formed through the rotating bracket body 451 and communicating with the translational bracket main hole 432, and a rotating bracket auxiliary hole 453 formed through the rotating bracket body 451 and communicating with a cam hole 472 which will be described later. An area of the rotating bracket main hole 452 may be wider that an area of the translational bracket main hole 432. The rotating bracket main hole 452 may be elongated in a direction away from the rotating bracket auxiliary hole 453. The rotating bracket main hole 452 may guide a moving path of the connecting shaft 460.

The rotating bracket 450 may be in contact with the shield 480. In a state in which the shield 480 is in contact with the rotating bracket 450, the leg L has the maximum open angle with respect to the lens frame (e.g., the lens frame 310 of FIG. 3A). In other words, in the state in which the shield 480 is in contact with the rotating bracket 450, the leg L may be maximally open with respect to the lens frame (e.g., the lens frame 310 of FIG. 3A).

When the rotating bracket 450 is rotated by the translational bracket 430, a position where the rotating bracket 450 and the translational bracket 430 are in contact with each other may be changed with respect to the housing 420. For example, when the rotating bracket 450 rotates counterclockwise, a point where the rotating bracket 450 and the translational bracket 430 are in contact with each other may be changed in a counterclockwise direction with respect to the housing 420. For example, the rotating bracket 450 and the translational bracket 430 may be in contact with each other at two points, and positions of the two points may move according to a position of the rotating bracket 450. As the rotating bracket 450 rotates, the maximum open angle of the leg L may be changed. When the maximum open angle of the leg L increases, a distance between a pair of legs may increase.

In another example, when the rotating bracket 450 rotates clockwise, the point where the rotating bracket 450 and the translational bracket 430 are in contact with each other may be changed in a clockwise direction with respect to the housing 420, and accordingly, the maximum open angle may decrease. When the maximum open angle of the pair of legs L decreases, the distance between the pair of legs may decrease. The rotating bracket 450 may include a rotating bracket groove 451a recessed in the rotating bracket body 451 and accommodating at least a portion of the shield 480.

The connecting shaft 460 may connect the translational bracket 430 and the rotating bracket 450. The connecting shaft 460 may transmit power from the translational bracket 430 to the rotating bracket 450. The connecting shaft 460 may pass through the translational bracket main hole 432 and the rotating bracket main hole 452. A diameter of the connecting shaft 460 may be approximately similar to an internal diameter of the translational bracket main hole 432. According to the above structure, the connecting shaft 460 may perform a translational motion together with the translational bracket 430. The rotating bracket main hole 452 may have a wider shape than the translational bracket main hole 432. The connecting shaft 460 may move along the rotating bracket main hole 452. When the connecting shaft 460 pushes the rotating bracket 450, the rotating bracket 450 may rotate with respect to the housing 420.

A direction in which the input screw 440 is inserted into the translational bracket 430 and a direction in which the connecting shaft 460 is inserted into the translational bracket 430 may intersect with each other. The connecting shaft 460 may be provided parallel to the height direction of the housing 420, and the input screw 440 may be provided in parallel to a direction perpendicular to the height direction of the housing 420. According to the insertion direction of the input screw 440 as described above, as the input screw 440 may be installed at a side portion of the housing 420 in which a wider area is relatively easily secured, it may be possible to improve space utilization.

The input screw 440, the translational bracket 430, the connecting shaft 460, and the rotating bracket 450 may each perform a 1 DoF motion. While the connecting shaft 460 moves along the rotating bracket main hole 452, the rotating bracket 450 may rotate with respect to the housing 420. A user may rotate the rotating bracket 450 by operating the input screw 440.

The main shaft M may be connected to the rotating bracket 450 and support the cam 470. For example, the main shaft M may function as a rotation axis for the cam 470. The main shaft M may pass through the rotating bracket auxiliary hole 453 and the cam hole 472. The rotating bracket auxiliary hole 453 and the cam hole 472 may communicate with each other.

The cam 470 may include a cam head 471 rotatably connected to the main shaft M, the cam hole 472 formed through the cam head 471, a cam body 473 extending from the cam head 471 to the outside of the housing 420, and a cam cover 474 connected to the cam body 473 and supporting the spring S. The cam cover 474 may be mounted at an end portion of the cam body 473 and may prevent or reduce the spring S from being separated. The cam cover 474 may include at least one loop shaped plate.

The shield 480 may be connected to the cam 470. The shield 480 may hang on the rotating bracket 450. The shield 480 may include a shield body 481 capable of moving in a longitudinal direction of the cam 470 and a shield plate 482 extending from the shield body 481 and capable of being in contact with the rotating bracket 430. The shield plate 482 may have a curved shape to surround the main shaft M. For example, the shield plate 482 may have a concave shape toward the main shaft M.

The spring S may be accommodated in the shield 480. The spring S may have one end supported by the cam 470 and the other end supported by the shield 480. The spring S may surround the cam 470. The spring S may deform while the cam 470 rotates around the main shaft M.

The leg L may be connected to the shield 480. The leg L may be connected to be fixed to the shield 480 and move together with the shield 480.

Figure 5A:
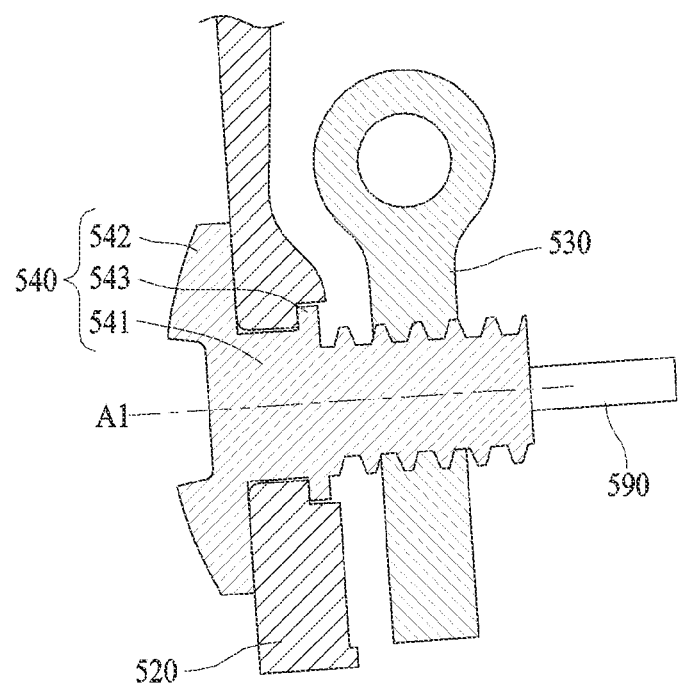
FIGS. 5A, 5B, and 5C are cross-sectional views illustrating a housing, an input screw, and a translational bracket of a wearable electronic device according to various embodiments.
Figure 5B:
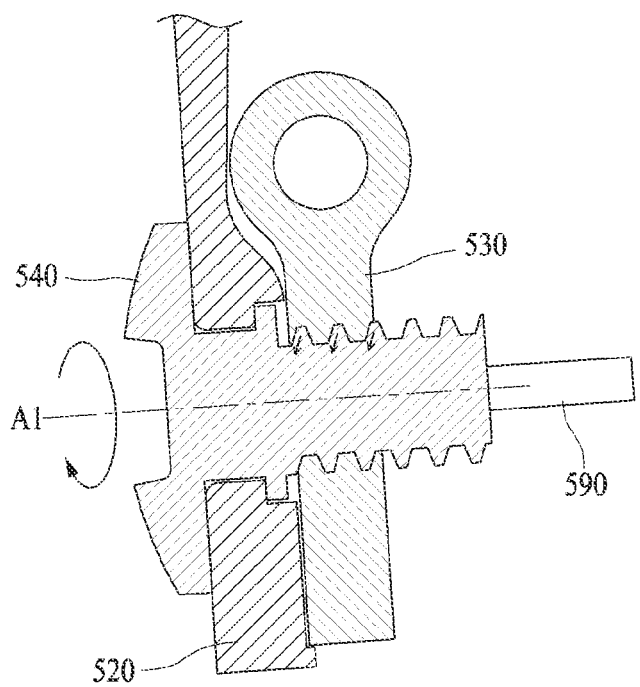
Figure 5C:
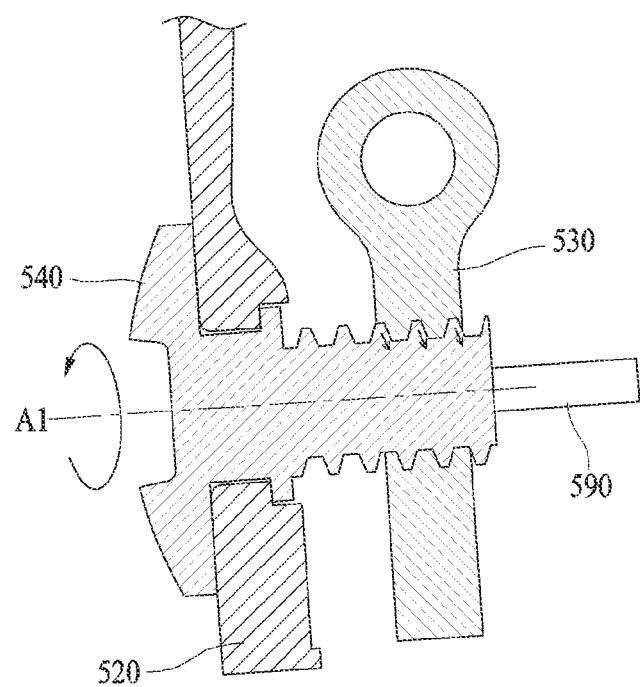

FIGS. 5A, 5B, and 5C are cross-sectional views illustrating a housing, an input screw, and a translational bracket of a wearable electronic device according to various embodiments.

Referring to FIGS. 5A, 5B and 5C (which may be referred to as FIGS. 5A to 5C), a wearable electronic device may include a housing 520, an input screw 540 rotatably connected to the housing 520, a translational bracket 530 for performing a translational motion by the input screw 540, and a guide shaft 590 for guiding a motion direction of the translational bracket 530. The input screw 540 and the guide shaft 590 may be parallel to each other.

The input screw 540 may include a screw body 541 penetrating through an outer wall of the housing 520, a screw head 542 formed at one end of the screw body 541, wherein one surface of the screw head 542 is in contact with an outer surface of the outer wall of the housing 520, and a screw projection 543 protruding from the screw body 541, wherein one surface of the screw projection 543 is in contact with an inner surface of the outer wall of the housing 520. The screw projection 543 may have, for example, a loop shape surrounding the screw body 541.

The input screw 540, in a state of being restricted from moving in an axial direction by the screw head 542 and the screw projection 543, may rotate with respect to the housing 520. The input screw 540 may be screwed to the translational bracket 530. The input screw 540 may assist with the translational motion of the translational bracket 530 by transmitting a force to screw threads of the translational bracket 530.

For example, referring to FIG. 5B, when the input screw 540 rotates clockwise around a first rotation axis A1, screw threads of the input screw 540 may apply a force to the screw threads of the translational bracket 530 in an arrow direction, and the translational bracket 530 may perform a translational motion in a direction toward the outer wall of the housing 520.

For example, referring to FIG. 5C, when the input screw 540 rotates counterclockwise around the first rotation axis A1, the screw threads of the input screw 540 may apply the force to the screw threads of the translational bracket 530 in an arrow direction, and the translational bracket 530 may perform a translational motion in a direction away from the outer wall of the housing 520.

Figure 6A:
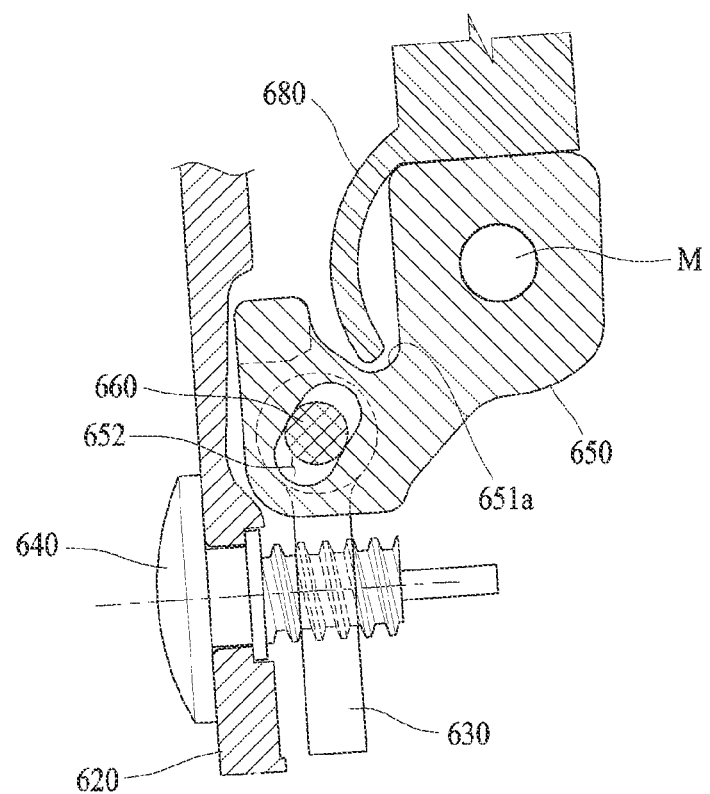
FIGS. 6A, 6B, and 6C are partial cross-sectional views illustrating a wearable electronic device according to various embodiments.
Figure 6B:
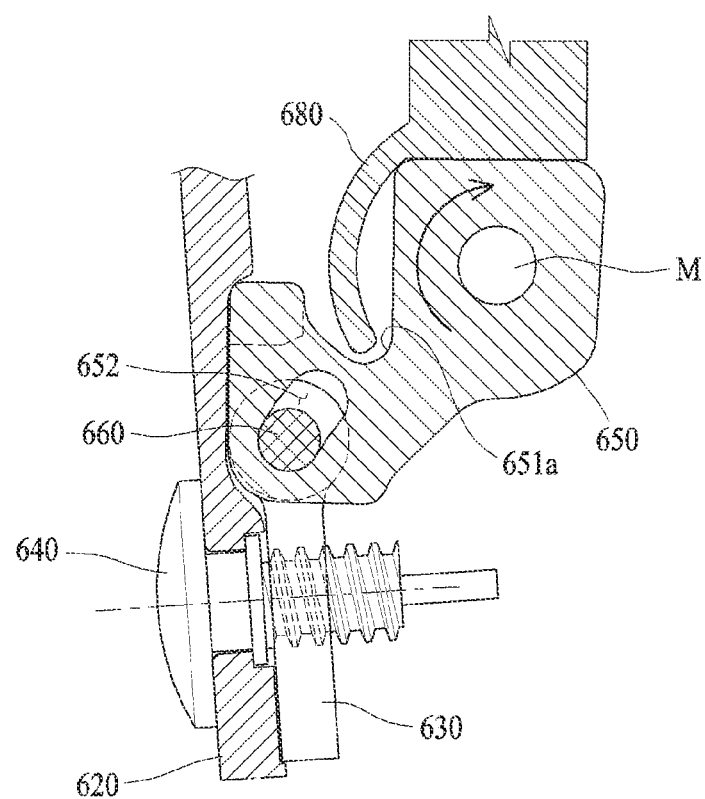
Figure 6C:
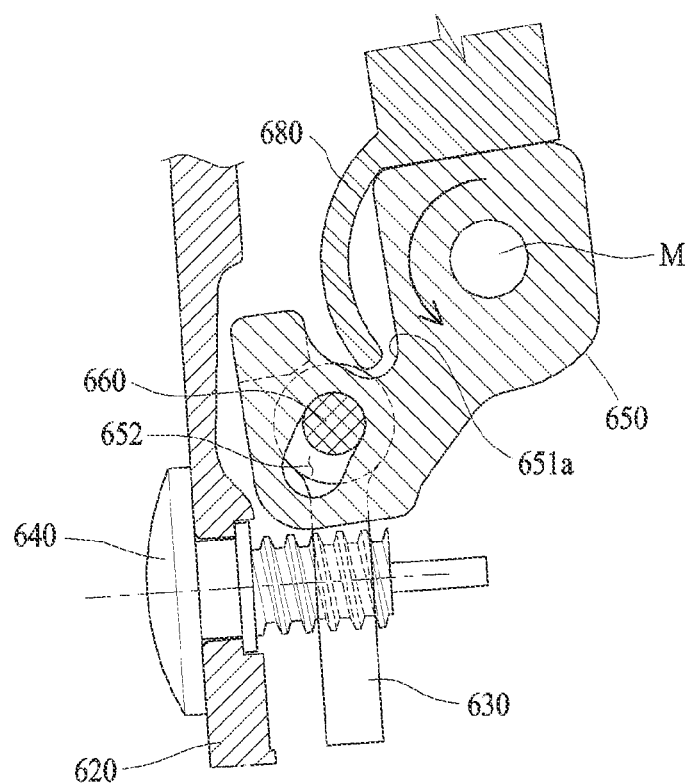

FIGS. 6A, 6B, and 6C are partial cross-sectional views illustrating a wearable electronic device according to various embodiments.

Referring to FIGS. 6A, 6B and 6C (which may be referred to as FIGS. 6A to 6C), a wearable electronic device may include a housing 620, an input screw 640 rotatably connected to the housing 620, a translational bracket 630 in which a translational motion may be performed by the input screw 640, a rotating bracket 650 overlapping the translational bracket 630, a connecting shaft 660 passing through the translational bracket 630 and the rotating bracket 650 and capable of moving along a rotating bracket main hole 652, a main shaft M connected to the rotating bracket 650, and a shield 680 capable of rotating around the main shaft M.

The shield 680 may include a shield end 680*a* capable of hanging on the rotating bracket 650. The rotating bracket 650 may include a rotating bracket groove 651*a* recessed toward a lens frame (e.g., the lens frame 310 of FIG. 3A) to accommodate the shield end 680*a*.

Even in a state in which the shield 680 is positioned close to the lens frame (e.g., the lens frame 310 of FIG. 3A), for example, a leg (e.g., the leg L of FIG. 3A) is folded, the shield 680 may cover at least a portion of the main shaft M to reduce a phenomenon in which foreign materials enter an inner side of the housing 620. As an area of the shield 680 surrounding the main shaft M increases, an effect of blocking the foreign materials may increase. The rotating bracket groove 651*a* may provide a space for the shield 680 to secure a sufficient area.

Rotating power of the input screw 640 may be transmitted to the translational bracket 630, power of the translational bracket 630 may be transmitted to the rotating bracket 650 through the connecting shaft 660, and the rotating bracket 650 may rotate around the main shaft M.

For example, referring to FIG. 6B, when the translational bracket 630 performs a translational motion toward an outer wall of the housing 620, the rotating bracket 650 may receive power from the connecting shaft 660 of the rotating bracket 650 to rotate clockwise. In this case, a distance between a pair of legs (e.g., the legs L of FIG. 3A) may decrease.

For example, referring to FIG. 6C, when the translational bracket 630 performs the translational motion in a direction away from the outer wall of the housing 620, the rotating bracket 650 may receive power from the connecting shaft 660 of the rotating bracket 650 to rotate counterclockwise. In this case, the distance between the pair of legs (e.g., the legs L of FIG. 3A) may increase.

Figure 7A:
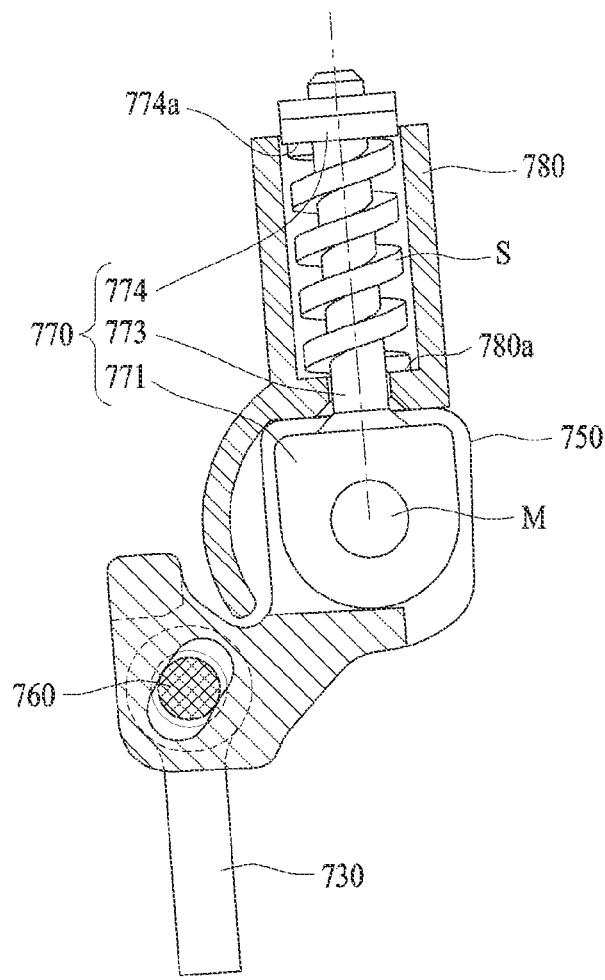
FIGS. 7A, 7B, and 7C are partial cross-sectional views illustrating deformation of a spring according to various embodiments.
Figure 7B:
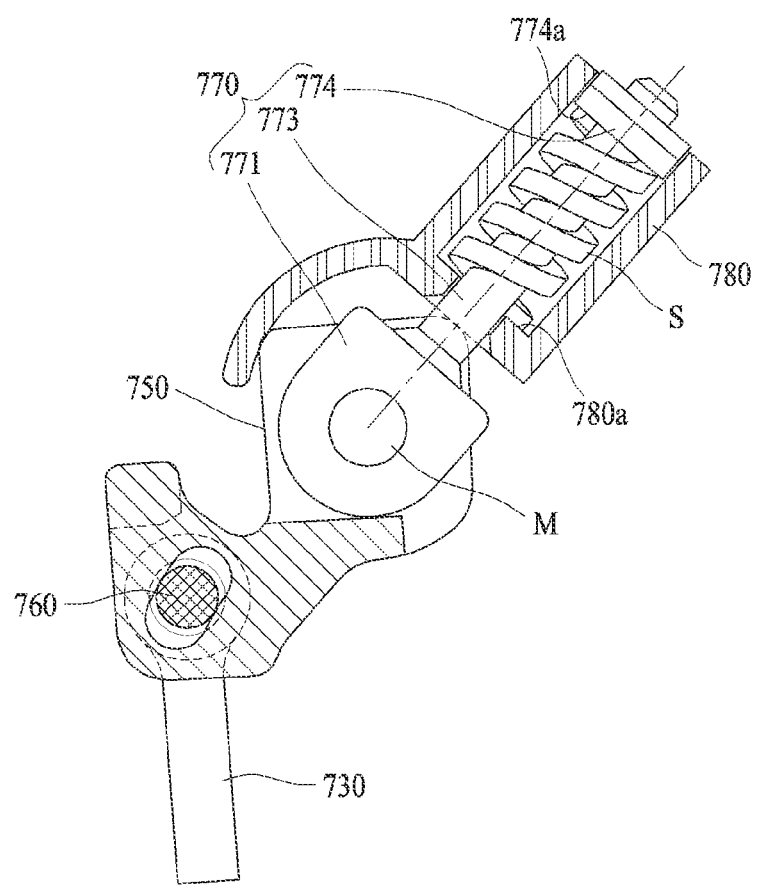
Figure 7C:
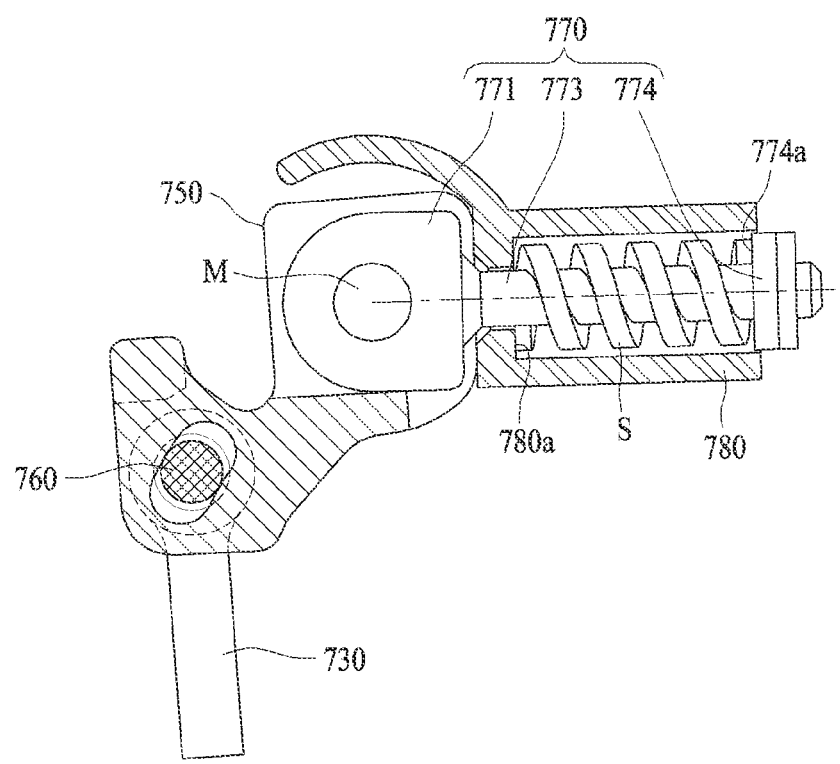

FIGS. 7A, 7B, and 7C are partial cross-sectional views illustrating deformation of a spring according to various embodiments.

Referring to FIGS. 7A, 7B and 7C (which may be referred to as FIGS. 7A to 7C), a wearable electronic device, according to an example embodiment, may have a detent structure. The wearable electronic device may include a translational bracket 730, a connecting shaft 760 connected to the translational bracket 730, a rotating bracket 750 connected to the connecting shaft 760, a main shaft M connected to the rotating bracket 750, a cam 770 capable of rotating around the main shaft M, a shield 780 connected to the cam 770, and a spring S provided inside of the shield 780.

The cam 770 may include a cam head 771, a cam body 773 extending from the cam head 771, and a cam cover 774 connected to one end of the cam body 773. One end of the spring S may be supported by the shield 780, and the other end of the spring S may be supported by the cam cover 774.

While the cam 770 rotates around the main shaft M, the shield 780 may move along the cam 770. For example, while the shield 780 moves in a direction away from the main shaft M, the spring S may be compressed and deformed by the cam 770 and the shield 780. For example, the spring S, while a leg (e.g., the leg L of FIG. 3A) rotates toward a lens frame (e.g., the lens frame 310 of FIG. 3A) in a state of being completely open, may be compressed and then stretch. For example, when the cam 770 is completely open, in other words, when the leg (e.g., the leg L in FIG. 3A) is completely open, a distance between a surface 780*a* of the shield 780 supporting the spring S and a surface 774*a* of the cam cover 774 supporting the spring S may be at maximum, and when the leg (e.g., the leg L of FIG. 3A) is positioned at an approximately 45-degree angle with respect to the lens frame (e.g., the lens frame 310 of FIG. 3A), a distance between a surface 780*a* of the shield 780 supporting the spring S and the cam cover 774 may be at minimum. According to the above structure, the leg L (e.g., the leg L of FIG. 3A) may tend to be restored to an open state or a folded state by a restoring force of the spring S.

For example, the rotating bracket 750, in a direction parallel to a longitudinal direction of the translational bracket 730 and in a direction perpendicular to the longitudinal direction of the translational bracket 730, may have a shape that relatively slightly protrudes from the main shaft M. The rotating bracket 750, in a direction to form an approximately 45-degree angle with respect to the longitudinal direction of the translational bracket 730, may have a shape that relatively greatly protrudes from the main shaft M.

According to various example embodiments, a wearable electronic device may include: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and a rotating bracket auxiliary hole spaced apart from the rotating bracket main hole, and rotatably connected to the housing, and a connecting shaft passing through the translational bracket main hole and the rotating bracket main hole configured to rotate the rotating bracket while moving together with the translational bracket main hole.

According to various example embodiments, the wearable electronic device may further include: a cam having a cam hole communicating with the rotating bracket auxiliary hole and rotatably connected to the rotating bracket, a shield connected to the cam and capable of hanging on the rotating bracket, and a leg connected to the shield.

According to various example embodiments, the translational bracket may be configured to perform one-degree of freedom (1 DoF) motion within the housing.

According to various example embodiments, the input screw, the translational bracket, the connecting shaft, and the rotating bracket may be configured to perform the 1 DoF motion.

According to various example embodiments, an area of the rotating bracket main hole may be wider than an area of the translational bracket main hole.

According to various example embodiments, the rotating bracket may be configured to rotate with respect to the housing while the connecting shaft moves along the rotating bracket main hole.

According to various example embodiments, based on the input screw rotating in a first direction, the translational bracket may be configured to perform a translational motion in a direction toward an outer wall of the housing, and based on the input screw rotating in a second direction opposite to the first direction, the translational bracket may be configured to perform the translational motion in a direction away from the outer wall of the housing.

According to various example embodiments, the input screw may include a screw body penetrating through the outer wall of the housing and screwed to the translational bracket and a screw head formed at one end of the screw body wherein one surface of the screw head is in contact with an outer surface of the outer wall of the housing.

According to various example embodiments, the input screw may include a screw projection protruding from the screw body and in contact with an inner surface of the outer wall of the housing.

According to various example embodiments, the shield may include a shield body capable of moving in a longitudinal direction of the cam and a shield plate extending from the shield body and capable of being in contact with the rotating bracket.

According to various example embodiments, the rotating bracket may include a rotating bracket groove recessed toward the lens frame, and the shield plate may be in contact with the rotating bracket in a state of being inserted into the rotating bracket groove.

According to various example embodiments, the wearable electronic device may further include a spring accommodated in the shield body, surrounding the cam, and configured to bring the shield body to be in contact with the rotating bracket.

According to various example embodiments, the cam may include a cam head rotatably connected to the rotating bracket, a cam body extending from the cam head, and a cam cover connected to the cam body and supporting the spring.

According to various example embodiments, the spring may be configured to be compressed and stretched while the leg is completely open and rotates toward the lens frame.

According to various example embodiments, the wearable electronic device may include at least the two guide shafts installed in the housing, positioned parallel to the input screw, and penetrating through the translational bracket.

According to various example embodiments, a wearable electronic device may include: a lens frame capable of accommodating a lens, a housing extending from the lens frame, a translational bracket having a translational bracket main hole and capable of moving in one-degree of freedom (1 DoF) within the housing, an input screw penetrating through an outer wall of the housing and screwed to the translational bracket, a rotating bracket having a rotating bracket main hole communicating with the translational bracket main hole and a rotating bracket auxiliary hole spaced apart from the rotating bracket main hole, and rotatably connected to the housing, a connecting shaft passing through the translational bracket main hole and the rotating bracket main hole configured to rotate the rotating bracket while moving together with the translational bracket main hole, a cam having a cam hole communicating with the rotating bracket auxiliary hole and rotatably connected to the rotating bracket, a shield connected to the cam and capable of hanging on the rotating bracket, and the leg connected to the shield.

According to various example embodiments, a wearable electronic device may include: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and having a wider area than the translational bracket main hole and a rotating bracket auxiliary hole spaced apart from the rotating bracket main hole, and rotatably connected to the housing, a connecting shaft passing through the translational bracket main hole and the rotating bracket main hole configured to rotate the rotating bracket while moving together with the translational bracket main hole, a cam having a cam hole communicating with the rotating bracket auxiliary hole and rotatably connected to the rotating bracket, a shield connected to the cam and capable of hanging on the rotating bracket, and a leg connected to the shield.

According to various example embodiments, a direction in which the input screw is inserted into the translational bracket and a direction in which the connecting shaft is inserted into the translational bracket may intersect with each other.

According to various example embodiments, the rotating bracket may be configured to rotate with respect to the housing while the connecting shaft moves along the rotating bracket main hole.

According to various example embodiments, based on the input screw rotating in a first direction, the translational bracket may be configured to perform a translational motion in a direction toward the outer wall of the housing, and based on the input screw rotating in a second direction opposite to the first direction, the translational bracket may be configured to perform the translational motion in a direction away from the outer wall of the housing.

According to various example embodiments, a wearable electronic device may include: a lens frame capable of accommodating a lens, a housing extending from the lens frame, a translational bracket having a translational bracket main hole and capable of moving within the housing, an input screw penetrating through an outer wall of the housing and screwed to the translational bracket, a rotating bracket having a rotating bracket main hole communicating with the translational bracket main hole and having a wider area than the translational bracket main hole and a rotating bracket auxiliary hole spaced apart from the rotating bracket main hole, and rotatably connected to the housing, a connecting shaft passing through the translational bracket main hole and a rotating bracket main hole configured to rotate the rotating bracket while moving together with the translational bracket main hole, a cam having a cam hole communicating with the rotating bracket auxiliary hole and rotatably connected to the rotating bracket, a shield connected to the cam and capable of hanging on the rotating bracket, and a leg connected to the shield.

While the disclosure has been illustrated and described with reference to various example embodiments, it will be understood that the various example embodiments are intended to be illustrative, not limiting. It will be further understood by those skilled in the art that various changes and modifications may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:
   a lens frame configured to accommodate a lens;
   a housing extending from the lens frame;
   a translational bracket having a translational bracket main hole;
   an input screw penetrating through an outer wall of the housing and screwed to the translational bracket, wherein the translational bracket is displaced in the housing with rotation of the input screw;
   a rotating bracket having a rotating bracket main hole aligned with the translational bracket main hole, the rotating bracket comprising a rotating bracket auxiliary hole spaced apart from the rotating bracket main hole, wherein the rotating bracket is rotatably connected to the housing; and
   a connecting shaft passing through the aligned translational bracket main hole and the rotating bracket main hole, wherein displacement of the translational bracket and the connecting shaft creates rotation of the rotating bracket.

2. The wearable electronic device of claim 1, further comprising:
   a cam having a cam hole communicating with the rotating bracket auxiliary hole, and rotatably connected to the rotating bracket;
   a shield connected to the cam and configured to hang on the rotating bracket; and
   a leg connected to the shield.

3. The wearable electronic device of claim 1, wherein the translational bracket is configured for one-degree of freedom (1DoF) translational motion within the housing along a linear axis.

4. The wearable electronic device of claim 1, wherein a direction in which the input screw is inserted into the translational bracket and a direction in which the connecting shaft is inserted into the translational bracket intersect.

5. The wearable electronic device of claim 1, an area of the rotating bracket main hole is wider than an area of the translational bracket main hole.

6. The wearable electronic device of claim 1, wherein the rotating bracket is configured to rotate with respect to the housing while the connecting shaft moves along the rotating bracket main hole.

7. The wearable electronic device of claim 1, wherein the translational bracket is configured to perform a translational motion in a direction toward the outer wall of the housing based on the input screw rotating in a first direction, and the translational bracket is configured to perform a translational motion in a direction away from the outer wall of the housing based on the input screw rotating in a second direction opposite to the first direction.

8. The wearable electronic device of claim 1, wherein the input screw comprises:
   a screw body penetrating through the outer wall of the housing and screwed to the translational bracket; and
   a screw head formed at one end of the screw body, wherein one surface of the screw head is in contact with an outer surface of the outer wall of the housing.

9. The wearable electronic device of claim 8, wherein the input screw further comprises a screw projection protruding from the screw body and in contact with an inner surface of the outer wall of the housing.

10. The wearable electronic device of claim 2, wherein the shield comprises:
    a shield body capable of moving in a longitudinal direction of a cam; and
    a shield plate extending from the shield body and configured to contact the rotating bracket.

11. The wearable electronic device of claim 10, wherein the rotating bracket comprises a rotating bracket groove recessed toward the lens frame, and the shield plate is in contact with the rotating bracket in a state of being inserted into the rotating bracket groove.

12. The wearable electronic device of claim 10, wherein the wearable electronic device further comprises a spring accommodated within the shield body, surrounding the cam, and is configured to bring the shield body to be in contact with the rotating bracket.

13. The wearable electronic device of claim 12, wherein the cam comprises:
    a cam head rotatably connected to the rotating bracket;
    a cam body extending from the cam head; and
    a cam cover connected to the cam body and supporting the spring.

14. The wearable electronic device of claim 12, wherein the spring is configured to be compressed and stretched while the leg is completely open and rotates toward the lens frame.

15. The wearable electronic device of claim 1, wherein the wearable electronic device further comprises at least two of guide shafts installed in the housing, located in parallel with the input screw, and penetrating through the translational bracket.

16. A wearable electronic device comprising:
    a lens frame configured to accommodate a lens;
    a housing extending from the lens frame;
    a translational bracket having a translational bracket main hole;
    an input screw penetrating through an outer wall of the housing and screwed to the translational bracket, wherein the translational bracket is displaced in one-degree of freedom within the housing with rotation of the input screw;
    a rotating bracket having a rotating bracket main hole aligned with the translational bracket main hole, the rotating bracket comprises a rotating bracket auxiliary hole spaced apart from the rotating bracket main hole, wherein the rotating bracket is rotatably connected to the housing, and wherein the rotating bracket is rotatable relative to the translational bracket;
    a connecting shaft passing through the aligned translational bracket main hole and the rotating bracket main hole, wherein displacement of the translational bracket and the connecting shaft creates rotation of the rotating bracket while moving together with the translational bracket main hole;

a cam having a cam hole communicating with the rotating bracket auxiliary hole, and rotatably connected to the rotating bracket;

a shield connected to the cam and configured to hang on the rotating bracket; and a leg connected to the shield.

17. The wearable electronic device of claim 16, wherein a direction in which the input screw is inserted into the translational bracket and a direction in which the connecting shaft is inserted into the translational bracket intersect.

18. The wearable electronic device of claim 16, wherein the rotating bracket is configured to rotate with respect to the housing while the connecting shaft moves along the rotating bracket main hole.

19. The wearable electronic device of claim 16, wherein the translational bracket is configured to perform a translational motion in a direction of moving closer to the outer wall of the housing based on the input screw rotating in a first direction, and the translational bracket performs a translational motion in a direction of moving further from the outer wall of the housing based on the input screw rotating in a second direction opposite to the first direction.

20. A wearable electronic device comprising:

a lens frame configured to accommodate a lens;

a housing extending from the lens frame; a translational bracket having a translational bracket main hole;

an input screw penetrating through an outer wall of the housing and screwed to the translational bracket, wherein the translational bracket is displaced within the housing with rotation of the input screw;

a rotating bracket having a rotating bracket main hole aligned with the translational bracket main hole and having an area wider than an area of the translational bracket main hole, the rotating bracket comprising a rotating bracket auxiliary hole spaced apart from the rotating bracket main hole, wherein the rotating bracket is rotatably connected to the housing;

a connecting shaft passing through the aligned translational bracket main hole and the rotating bracket main hole, wherein displacement of the translational bracket and the connecting shaft creates rotation of the rotating bracket while moving together with the translational bracket main hole;

a cam having a cam hole communicating with the rotating bracket auxiliary hole, and rotatably connected to the rotating bracket;

a shield connected to the cam and configured to hang on the rotating bracket; and a leg connected to the shield.

\* \* \* \* \*